(12) United States Patent
Hirata (10) Patent No.: US 6,377,008 B1
(45) Date of Patent: Apr. 23, 2002

(54) MOTOR DRIVING DEVICE (75) Inventor: Shigeru Hirata, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 3 days.

(21) Appl. No.: 09/614,909

(22) Filed: Jul. 12, 2000

(30) Foreign Application Priority Data

Jul. 13, 1999 (JP) .......................................... 11-198425

(51) Int. Cl.[7] ................................................. H02P 1/00
(52) U.S. Cl. ...................... 318/459; 318/500; 318/254; 388/928.1
(58) Field of Search ................................ 318/254, 798, 318/799, 805, 806, 811, 459, 500; 388/928.1

(56) References Cited

U.S. PATENT DOCUMENTS

| | | | | |
|---|---|---|---|---|
| 5,245,256 A | * | 9/1993 | Cassat et al. ............... | 318/254 |
| 5,384,527 A | * | 1/1995 | Rozman et al. ............... | 322/10 |
| 5,481,167 A | * | 1/1996 | Rohrbaugh et al. ......... | 318/254 |
| 5,569,988 A | * | 10/1996 | Kokami et al. ............. | 318/254 |
| 5,572,097 A | * | 11/1996 | Cameron ..................... | 318/254 |
| 5,577,152 A | | 11/1996 | Chen .......................... | 388/804 |
| 5,635,810 A | * | 6/1997 | Goel ........................... | 318/719 |
| 5,783,917 A | * | 7/1998 | Takekawa ................... | 318/439 |
| 5,818,179 A | * | 10/1998 | Kokami et al. ............. | 318/254 |
| 5,869,946 A | | 2/1999 | Carobolante ................ | 318/811 |
| 6,111,372 A | * | 8/2000 | Nishimura .................. | 318/254 |
| 6,181,093 B1 | * | 1/2001 | Park et al. .................. | 318/254 |

FOREIGN PATENT DOCUMENTS

EP 0730341 A2 9/1996

* cited by examiner

*Primary Examiner*—Robert E. Nappi
*Assistant Examiner*—Rina I. Duda
(74) *Attorney, Agent, or Firm*—Arent Fox Kintner Plotkin & Kahn (57) ABSTRACT

In a motor driving device, the currents supplied from a driver (3) to three-phase coils (2) of a motor are made to flow through a resistor (R), and the voltage appearing across this resistor (R) is fed to the positive input terminal of a current limiting circuit (8). The differential signal between this voltage and a voltage (V) fed to the negative input terminal of the current limiting circuit (8) is fed as a voltage signal to an OR circuit (9). Also an FG signal produced by a logic circuit (5) to represent the rotational speed of the motor is fed, through a speed discriminator (6) and a filter (7), as a voltage signal to the OR circuit (9). The OR circuit (9) feeds a voltage signal having a high level to a PWM comparator (11), which produces a PWM signal and feeds it to the logic circuit (5). Thus, when the currents supplied to the three-phase coils (2) are about to exceed a limit, the currents are limited so as not to exceed the limit by the voltage signal output from the current limit circuit (8). When the currents supplied to the three-phase coils (2) are within the limit, the rotation speed of the motor is kept at a predetermined value by the voltage signal output from the filter (7) through control based on pulse-width modulation.

12 Claims, 8 Drawing Sheets

MOTOR DRIVING DEVICE

BACKGROUND OF THE INVENTION

1. Field of the Invention

The present invention relates to a motor driving device for driving a DC brushless motor as used in a drive apparatus for magnetic disks, optical disks, magneto-optical disks, and the like.

2. Description of the Prior Art

As one conventionally known type of motor driving device for driving a DC brushless motor, a motor driving device of a sensorless type is used that detects the rotation position of the rotor of a brushless motor by exploiting the back electromotive forces appearing individually in the three-phase coils provided in the brushless motor. Such a sensorless motor driving device converts the currents fed to those three-phase coils into a voltage signal, and, on the basis of this voltage signal, performs pulse-width modulation. The resulting pulse-width-modulated signal is used to control a driver that supplies the three-phase coils with currents. Here, if the driver is controlled by directly using that signal, it is not possible to detect the back electromotive forces appearing in the three-phase coils during time periods in which that signal are off. To avoid this, it is necessary to control the driver by using a signal obtained by smoothing the pulse-width-modulated signal with a filter or the like.

This inconvenience is overcome in the motor driving device proposed in Japanese Patent Application Laid-Open No. H8-223970. In the motor driving device proposed in this Japanese Patent Application Laid-Open No. H8-223970, the currents supplied to the three-phase coils are detected by using a detection resistor, and, on the basis of the voltage signal appearing across this detection resistor, pulse-width modulation is performed. Then, the resulting pulse-width-modulated signal is fed back to a logic circuit to achieve desired control.

Thus, in the motor driving device proposed in Japanese Patent Application Laid-Open No. H8-223970, control based on pulse-width modulation is achieved through feedback of the currents supplied to the three-phase coils. However, here, control based on pulse-width modulation is exercised directly, and therefore the currents supplied to the three-phase coils are incessantly turned on and off. Thus, to achieve control based on pulse-width modulation through feedback of those currents, it is inevitable to use a filter circuit to smooth the voltage signal obtained from those currents.

SUMMARY OF THE INVENTION

An object of the present invention is to provide a motor driving device that controls the rotation speed of a motor in accordance with a signal produced on the basis of the back electromotive forces appearing in motor coils, To achieve the above object, according to the present invention, a motor driving device is provided with: a driver for rotating a brushless motor by feeding currents to the motor coils provided, one for each phase, in the motor; and a speed detector for detecting the rotation speed of the motor by exploiting the back electromotive forces appearing in the motor coils . Here, the rotation speed of the motor is controlled by feeding a voltage signal output from the speed detector back to the driver after modulating the voltage signal by pulse-width modulation.

In this motor driving device configured as described above, for example when the load imposed on the brushless motor is light and the torque required by the motor is low, it is possible to control the motor through feedback based on its rotation speed.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
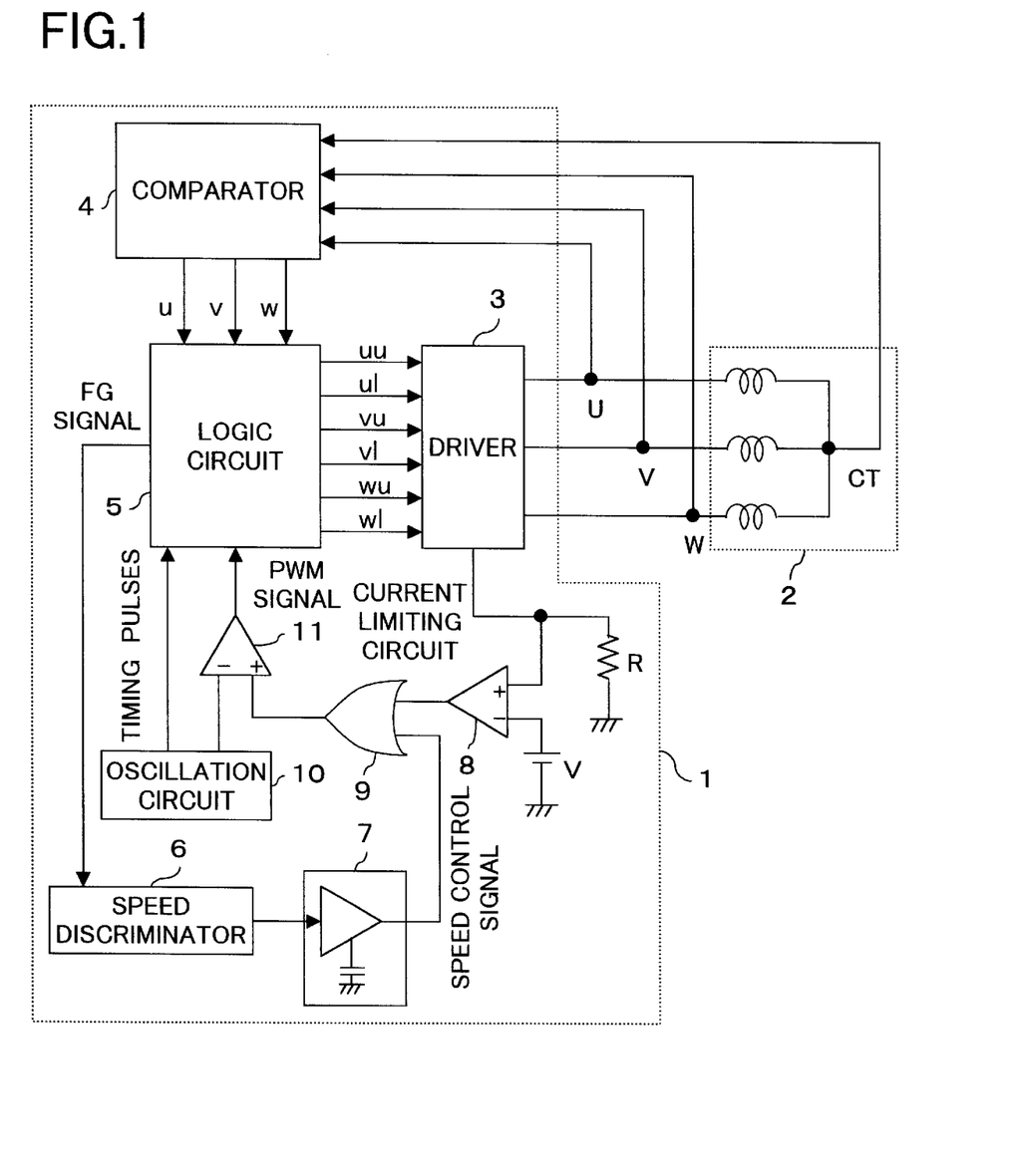
FIG. 1 a block diagram showing the internal configuration of the motor driving device embodying the invention.

Hereinafter, an embodiment of the present invention will be described with reference to the drawings. FIG. 1 is a block diagram showing the internal configuration of the motor driving device embodying the invention. The motor driving device 1 shown in FIG. 1 has a driver 3 for supplying drive currents to three-phase coils 2 of a brushless motor, a comparator 4 for comparing the voltages at the contacts U, V, and W of the three-phase coils 2 with the voltage at the center contact CT so as to produce three signals u, v, and w, and a logic circuit 5 for producing an FG signal, whose period represents the rotation speed of the motor, on the basis of the signals u, v, and w output from the comparator 4 so as to control the driver 3.

Moreover, the motor driving device 1 also has a speed discriminator 6 for producing error pulses from the FG signal output from the logic circuit 5, a filter 7 for producing a voltage signal used as a speed control signal from the error pulses output from the speed discriminator 6, a resistor R for detecting the currents flowing through the three-phase coils 2 and converting them into a voltage signal, a current limiting circuit 8 for detecting the voltage appearing across the resistor R and comparing it with a predetermined value V so as to output a differential voltage, an OR circuit 9 for delivering whichever is higher between the voltage signal from the filter 7 and the voltage signal from the current limiting circuit 8, an oscillation circuit 10 for producing a triangular wave and timing pulses for pulse-width modulation, and a PWM comparator 11 for producing a PWM signal by performing pulse-width modulation by comparing the triangular wave from the oscillation circuit 10 with the voltage signal from the OR circuit 9. Thus, the motor driving device 1 is so configured as to control the rotation speed of the brushless motor through feedback and also limit the currents flowing through the three-phase coils 2.

In this motor driving device 1 configured as described above, as shown in FIG. 2, the driver 3 is composed of a pnp-type transistor TU1 and an npn-type transistor TU2 both having their collectors connected to the contact U of the three-phase coils 2, a pnp-type transistor TV1 and an npn-type transistor TV2 both having their collectors connected to the contact V of the three-phase coils 2, and a pnp-type transistor TW1 and an npn-type transistor TW2 both having their collectors connected to the contact W of the three-phase coils 2. The transistors TU1, TV1, and TW1 receive, at their emitters, a supply voltage, and the transistors TU2, TV2, and TW2 have their emitters connected through the resistor R to ground. The transistors TU1, TV1, TW1, TU2, TV2, and TW2 receive, at their bases, signals uu, vu, wu, ul, vl, and wl, respectively, from the logic circuit 5.

Figure 3:
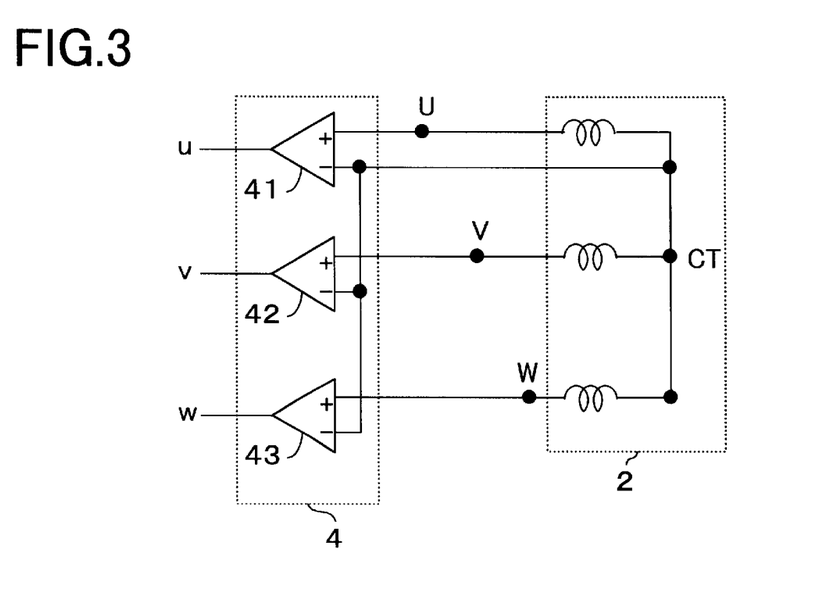
FIG. 3 is a circuit diagram showing the internal configuration of the comparator provided in the motor driving device shown in FIG. 1.
Figure 5:
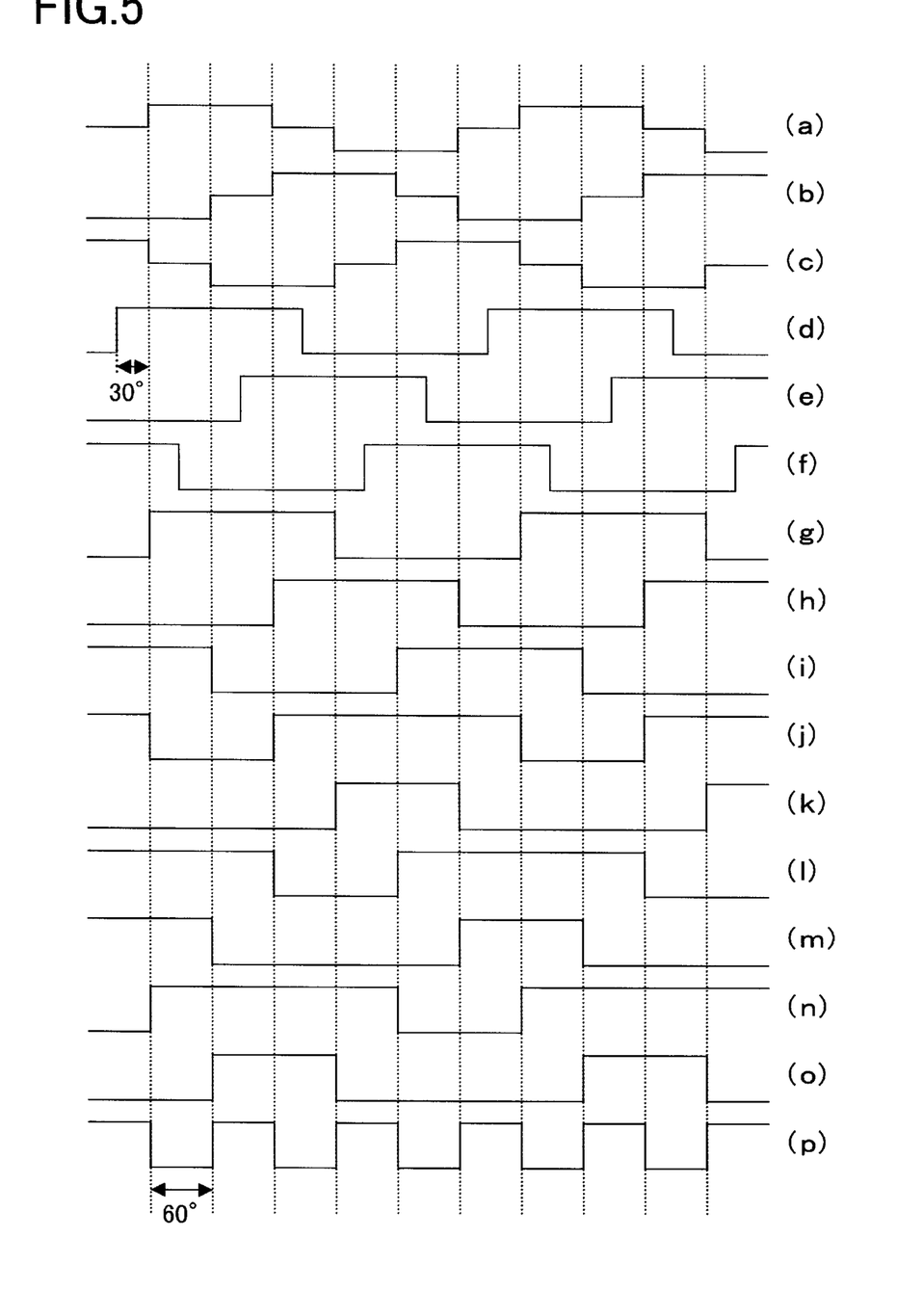
FIG. 5 is a timing chart showing the operation of the motor driving device shown in FIG. 1.

Moreover, as shown in FIG. 3, the comparator 4 has a comparator 41 that receives the voltages appearing at the contact U and the central contact CT of the three-phase coils 2 and that outputs a signal u, a comparator 42 that receives the voltages appearing at the contact V and the central contact CT of the three-phase coils 2 and that outputs a signal v, and a comparator 43 that receives the voltages appearing at the contact W and the central contact CT of the three-phase coils 2 and that outputs a signal w. These signals u, v, and w are affected by the voltages that appear as back electromotive forces in the three-phase coils 2 as the currents flowing therethrough vary, and thus the phases of these signals u, v, and w are delayed by approximately 30° as shown in FIG. 5.

Figure 4:
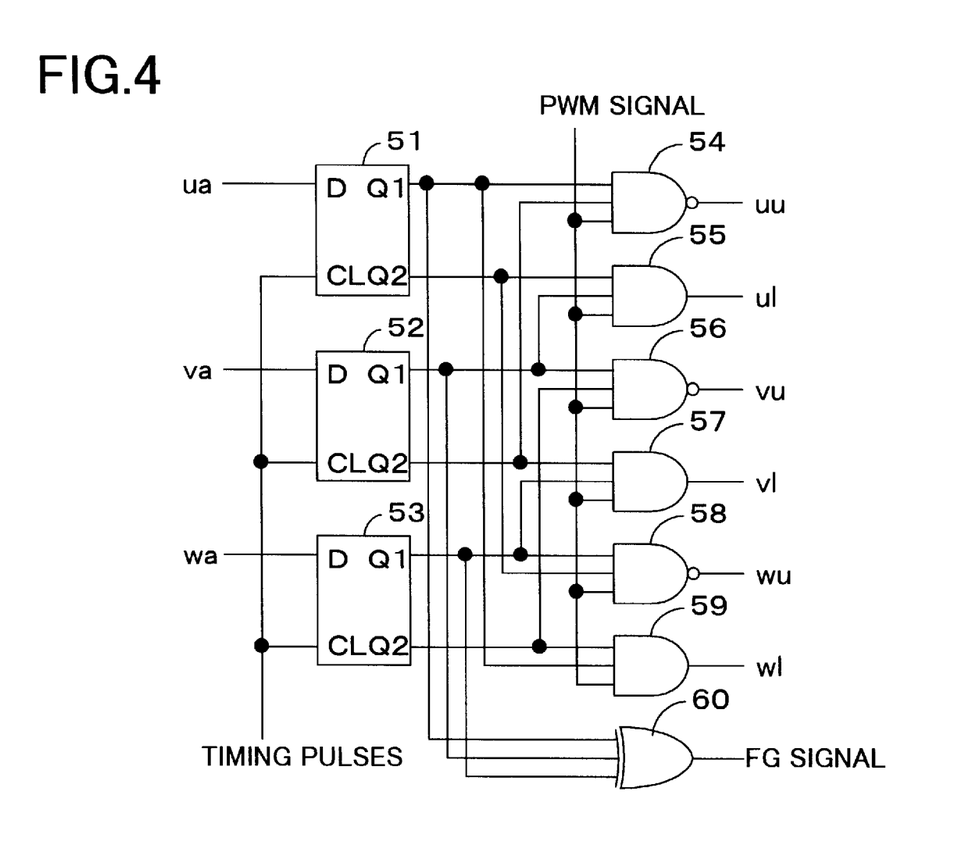
FIG. 4 is a circuit diagram showing the internal configuration of a portion of the logic circuit provided in the motor driving device shown in FIG. 1.

Moreover, as shown in FIG. 4, the logic circuit 5 has D flip-flops 51, 52, and 53 that receive, at their input terminals D, signals ua, va, and wa, respectively, that are obtained by delaying the signals u, v, and w from the comparator 4 by approximately 30° with delay circuits (not shown) or the like, a NAND circuit 54 that outputs a signal uu, an AND circuit 55 that outputs a signal ul, a NAND circuit 56 that outputs a signal vu, an AND circuit 57 that outputs a signal vl, a NAND circuit 58 that outputs a signal wu, an AND circuit 59 that outputs a signal wl, and an exclusive OR circuit 60 that outputs the FG signal.

In this logic circuit 5, the D flip-flops 51, 52, and 53 receive, at their clock terminals CL, timing pulses from the oscillation circuit 10. The NAND circuit 54 receives its inputs from the output terminal Q1 of the D flip-flop 51 and the output terminal Q2 of the D flip-flop 52, and the AND circuit 55 receives its inputs from the output terminal Q2 of the D flip-flop 51 and the output terminal Q1 of the D flip-flop 52. The NAND circuit 56 receives its inputs from the output terminal Q1 of the D flip-flop 52 and the output terminal Q2 of the D flip-flop 53, and the AND circuit 57 receives its inputs from the output terminal Q2 of the D flip-flop 52 and the output terminal Q1 of the D flip-flop 53.

The NAND circuit 58 receives its inputs from the output terminal Q1 of the D flip-flop 53 and the output terminal Q2 of the D flip-flop 51, and the AND circuit 59 receives its inputs from the output terminal Q2 of the D flip-flop 53 and the output terminal Q1 of the D flip-flop 51. Moreover, the NAND circuits 54, 56, and 58 and the AND circuits 55, 57, and 59 also receive the PWM signal output from the PWM comparator 11. The exclusive OR circuit 60 receives its inputs from the output terminals Q1 of the D flip-flops 51, 52, and 53.

Configured as described above, this motor driving device 1 operates as follows. First, suppose that the motor driven by the motor driving device 1 is operating normally. The driver 3 supplies currents to the three-phase coils 2 in such a way that a current as shown at (a) in FIG. 5 flows from the contact U to the contract CT, a current as shown at (b) in FIG. 5 flows from the contact V to the contract CT, and a current as shown at (c) in FIG. 5 flows from the contact W to the contract CT. It is to be noted that, in reality, these currents fed to the three-phase coils 2 are pulse-width-modulated, and are thus fed to the three-phase coils 2, as shown at (b) in FIG. 6, in synchronism with the PWM signal shown at (a) in FIG. 6.

These currents fed from the driver 3 cause voltages to appear at the contacts U, V, and W, and the comparators 41, 42, and 43 provided in the comparator 4 compare those voltages with the voltage at the contact CT and output voltage signals u, v, and w as shown respectively at (d), (e), and (f) in FIG. 5 to the logic circuit 5. It is to be noted that, in reality, these voltage signals u, v, and w are pulse-width-modulated, and are thus fed to the logic circuit 5, as shown at (c) in FIG. 6, in synchronism with the PWM signal shown at (a) in FIG. 6.

These voltage signals u, v, and w are, after having their phases delayed by approximately 30° by delay circuits (not shown) provided in the logic circuit 5, fed, as voltage signals ua, va, and wa, to the input terminals D of the D flip-flops 51, 52, and 53. These voltage signals ua, va, and wa are signals having phases delayed by 30° relative to the voltage signals u, v, and w, and thus, in reality, have a waveform as shown at (d) in FIG. 6. Here, the D flip-flops 51, 52, and 53 also receive, at their clock terminals CL, a timing clock as shown at (e) in FIG. 6, described later, from the oscillation circuit 10.

Figure 6:
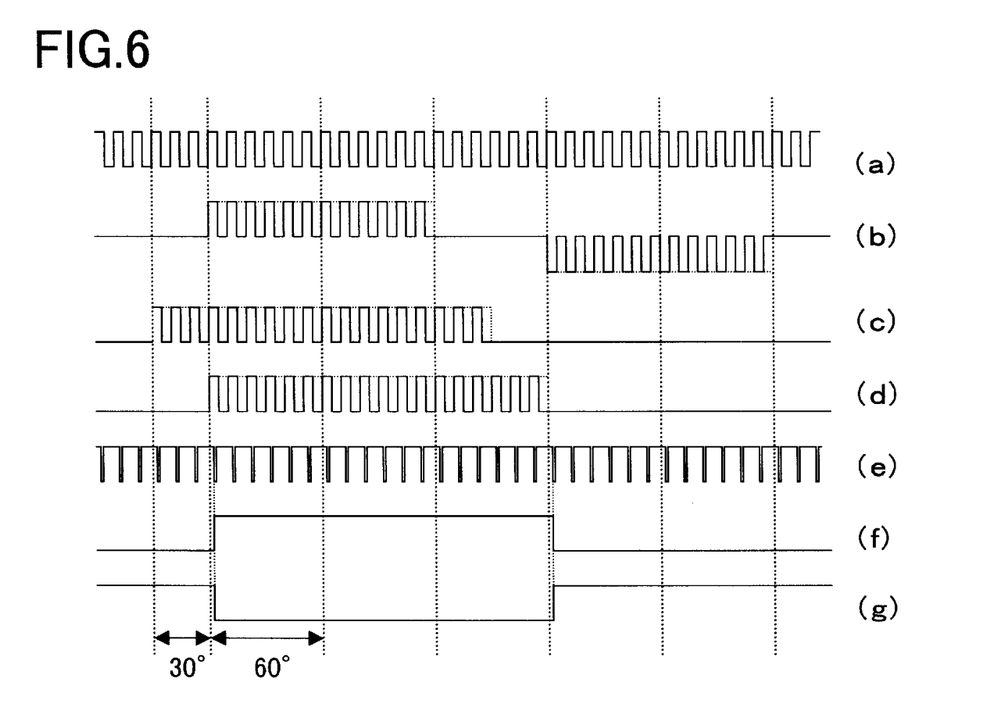
FIG. 6 is a timing chart showing the relationship between the signals that are synchronous with the PWM signal and the PWM signal itself, and showing the signals output from the D flip-flops.

The D flip-flops 51, 52, and 53 operate in synchronism with the timing clock as shown at (e) in FIG. 6, and thus they each latch a voltage signal as shown at (d) in FIG. 6 and then output it as a voltage signal as shown at (f) in FIG. 6 via their output terminals Q1. The signal that the D flip-flops 51, 52, and 53 each output via their output terminals Q2 is as shown at (g) in FIG. 6, i.e. an inverted version of the signal shown at (f) in FIG. 6.

Figure 7:
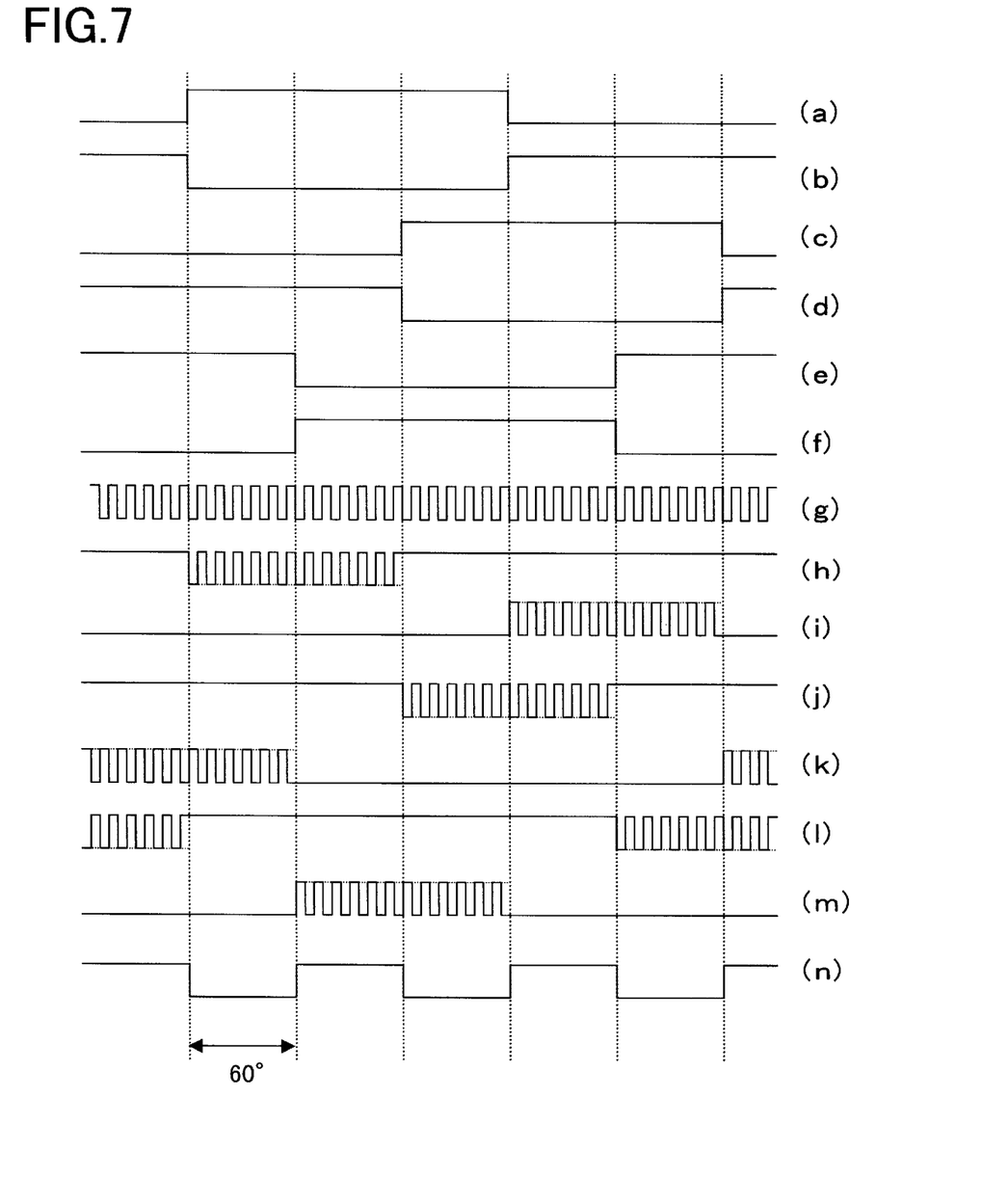
FIG. 7 is a timing chart showing the operation of the logic circuit shown in FIG. 4.

Now, suppose that the D flip-flops 51, 52, and 53 output, via their output terminals Q1, signals as shown respectively at (a), (c), and (e) in FIG. 7 and, via their output terminals Q2, signals as shown respectively at (b), (d), and (f) in FIG. 7, and in addition that, at this time, the PWM signal fed from the PWM comparator 11 is as shown at (g) in FIG. 7. Then, the signals uu, ul, vu, vl, wu, and wl are as shown respectively at (h), (i), (j), (k), (l), and (m) in FIG. 7, and the FG signal output from the exclusive OR circuit 60 is as shown at (n) in FIG. 7. Also in FIG. 5, the timing of the signals uu, ul, vu, vl, wu, and wl and of the output of the exclusive OR circuit 60 is shown at (j), (k), (l), (m), (n), (o), and (p) therein. It is to be noted that the timing shown at (j), (k), (l), (m), (n), (o), and (p) in FIG. 5 does not take the PWM signal into consideration.

These signals uu, ul, vu, vl, wu, and wl are fed to the driver 3 so as to be used to operate the previously-mentioned transistors provided in the driver 3. In this way, the currents fed to the three-phase coils 2 are controlled. Here, if, for example, the signals uu, ul and wl are at a low level and the signals vu, vl and wu are at a high level, the transistors TU1 and TV2 are turned on. Accordingly, in the three-phase coils 2, a current flows from the contact U via the contact CT to the contact V. That is, when the signal uu, vu, or wu is at a low level, the transistor TU1, TV1, or TW1, respectively, is turned on, and thus a current flows from the contact U, V, or W, respectively, to the contact CT in the three-phase coils 2; when the signal ul, vl, or wl is at a high level, the transistor TU2, TV2, or TW2, respectively, is turned on, and thus a current flows from the contact CT to the contact U, V, or W, respectively, in the three-phase coils 2. It is to be noted that, since the D flip-flops 51, 52, and 53 provided in the logic circuit 5 operate in synchronism with the timing pulses, the signals that they output via their output terminals Q1 and Q2 are synchronous with the trailing edges of the timing pulses. However, since the period of these timing pulses is very short as compared with the signals on which the individual circuit elements operate, in FIGS. 5 and 7, the signals appearing at the output terminals Q1 and Q2 are regarded as shifting their levels substantially in synchronism with the signals ua, va, and wa.

Figure 8A:
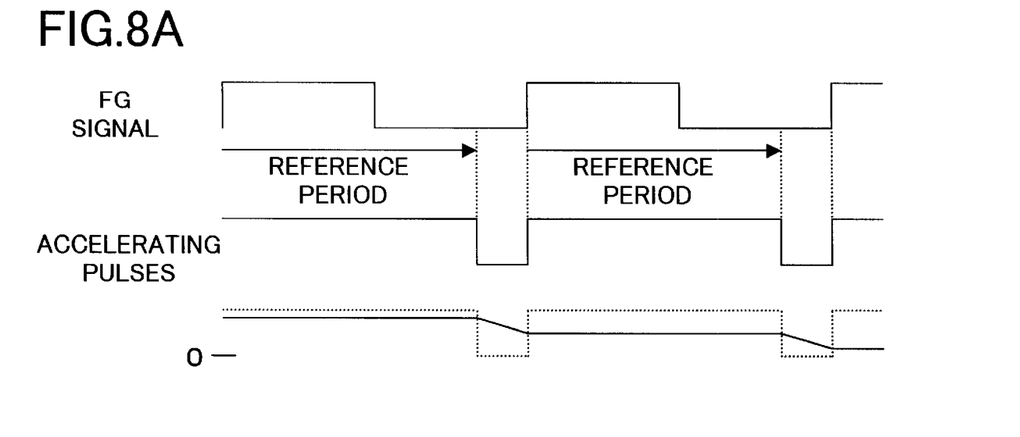
FIG. 8 is a timing chart showing the operation of the speed discriminator.

Now, the operation of the speed discriminator 6 that receives the FG signal produced by the exclusive OR circuit 60 as described above and the operation of the filter 7 will be described. First, how the speed discriminator 6 and the filter 7 operate when, as shown in FIG. 8A, the rotation speed of the brushless motor is low and thus the period of the FG signal is longer than a reference period will be described. In the speed discriminator 6, a level shift of the FG signal from a high-impedance state to a high level triggers comparison of the period of the FG signal, as counted with a counter (not shown) or the like, with a reference period.

In this case, the period of the FG signal is longer than the reference period, and therefore an accelerating pulse is produced that has a pulse width equal to the reference period subtracted from the period of the FG signal. This accelerating pulse is a pulse that turns from a high-impedance state to a low level, and therefore, every time this accelerating pulse is produced by the speed discriminator 6, a current flows from the filter 7 into the speed discriminator 6, and thereby decreases the voltage of the voltage signal output from the filter 7.

Figure 8B:
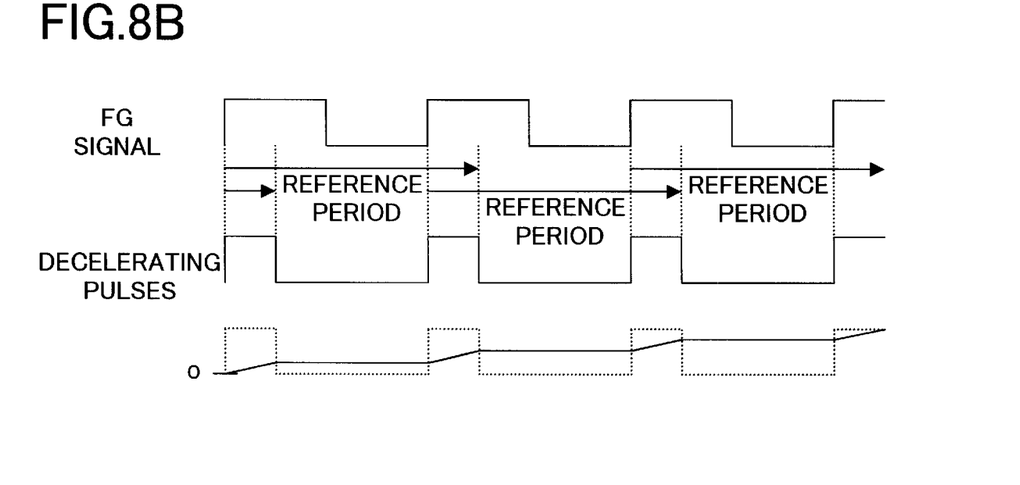

Next, how the speed discriminator 6 and the filter 7 operate when, as shown in FIG. 8B, the rotation speed of the brushless motor is high and thus the period of the FG signal is shorter than the reference period will be described. In the speed discriminator 6, a level shift of the FG signal to a high level triggers comparison of the period of the FG signal, as counted with a counter (not shown) or the like, with a reference period.

In this case, the period of the FG signal is shorter than the reference period, and therefore a decelerating pulse is produced that has a pulse width equal to the period of the FG signal subtracted from the reference period. This decelerating pulse is a high-level pulse, and therefore, every time this decelerating pulse is produced by the speed discriminator 6, a current flows from the speed discriminator 6 into the filter 7, and thereby increases the voltage of the voltage signal output from the filter 7.

Figure 9:
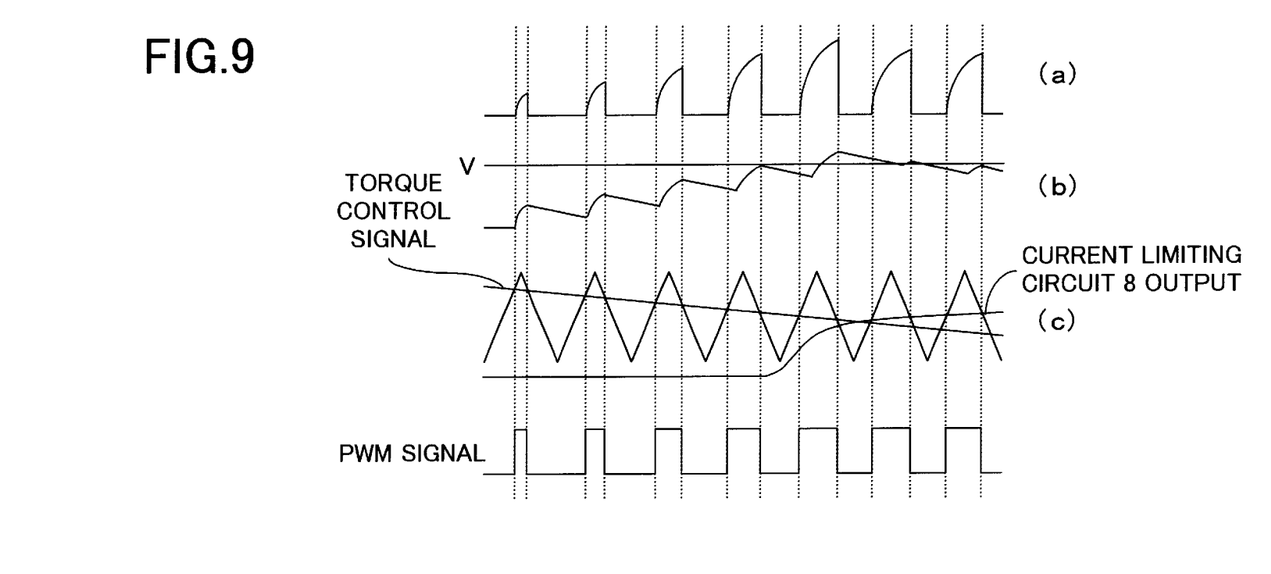
FIG. 9 is a timing chart showing the operation of the current limiting circuit.

On the other hand, the current limiting circuit 8 compares the voltage appearing across the resistor R as a result of the currents supplied from the driver 3 to the three-phase coils 2 flowing therethrough with a predetermined voltage V used as a limit voltage, and outputs the difference of those two voltages. Here, as shown at (a) in FIG. 9, the voltage appearing across the resistor R and fed to the positive input terminal of the current limiting circuit 8 is synchronous with the PWM signal. However, at the positive input terminal of the current limiting circuit 8 is provided a capacitance, which acts to hold the peaks of the voltage appearing across the resistor R and thereby turns it into a voltage signal as shown at (b) in FIG. 9. Thus, from this voltage signal as shown at (b) in FIG. 9 and the voltage V fed to the negative input terminal of the current limiting circuit 8, the current limiting circuit 8 produces a differentially amplified voltage signal as shown at (c) in FIG. 9 and feeds it to the OR circuit 9.

Figure 10:
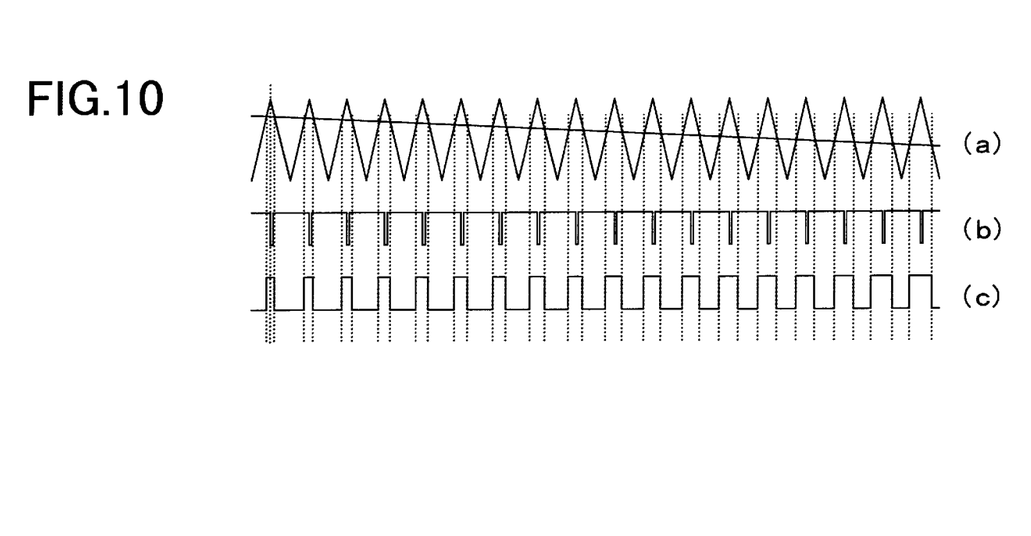
FIG. 10 is a timing chart showing the operation of the PWM comparator.

In this way, through the OR circuit 9, whichever has the higher voltage of the voltages fed from the filter 7 and from the current limiting circuit 8 is fed to the positive input terminal of the PWM comparator 11. In addition, a triangular wave as shown at (a) in FIG. 10 is fed from the oscillation circuit 10 to the negative input terminal of the PWM comparator 11. As described previously, this oscillation circuit 10 also feeds the logic circuit 5 with timing pulses. These timing pulses are, as shown at (b) in FIG. 10, so produced as to have trailing edges at the peaks of the triangular wave shown at (a) in FIG. 10 and have high-level periods sufficiently longer than low-level periods.

Now, suppose that the OR circuit 9 outputs a voltage signal as shown at (a) in FIG. 10. Then, a PWM signal is produced, as shown at (c) in FIG. 10, in such a way as to remain at a high level during periods in which the triangular wave is higher than this voltage signal output from the OR circuit 9, and the thus produced PWM signal is fed to the logic circuit 5. Accordingly, the higher the voltage signal output from the OR circuit 9, the lower the currents supplied from the driver 3 are made, and, the lower the voltage signal output from the OR circuit 9, the higher the currents supplied from the driver 3 are made.

Moreover, at the peaks of the triangular wave output from the oscillation circuit 10, i.e. at the trailing edges of the timing clocks, the signals ua, va, and wa, which are synchronous with the PWM signal, individually turn to a high level. Thus, the D flip-flops 51, 52, and 53, receiving at their input terminals D the signals ua, va, and wa and operating in synchronism with the trailing edges of the timing clock, latch the high-level portions of the signals ua, va, and wa and output them via their output terminals Q1.

In this motor driving device 1 operating as described above, when the load imposed on the brushless motor that is being driven is light, the currents fed to the three-phase coils 2 are low, and therefore it never occurs that the voltage appearing across the resistor R exceeds the limit voltage V. Accordingly, in this case, in accordance with the voltage signal output from the filter 7, the currents fed from the driver 3 to the three-phase coils 2 are controlled so that the rotation speed of the motor is controlled.

By contrast, when the load imposed on the brushless motor that is being driven is heavy, the currents fed to the three-phase coils 2 are high, and therefore it sometimes occurs that the voltage appearing across the resistor R exceeds the limit voltage V. Accordingly, in this case, even when the rotation speed of the motor as detected by the speed discriminator 6 is low, if the voltage appearing across the resistor R is higher than the limit voltage V, in accordance with the voltage signal output from the current limiting circuit 8, the currents fed from the driver 3 to the three-phase coils 2 are limited.

Figure 2:
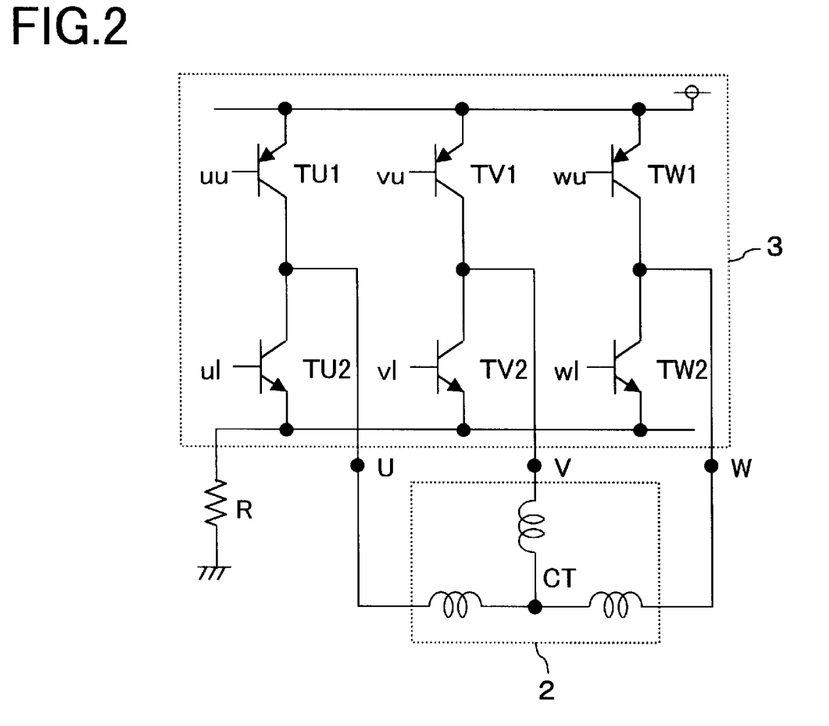
FIG. 2 is a circuit diagram showing the internal configuration of the driver provided in the motor driving device shown in FIG. 1.

It is to be understood that, in a motor driving device according to the present invention, the driver and the logic circuit may be configured in any other manner than specifically shown in FIGS. 2 and 4.

As described above, according to the present invention, when the load imposed on a brushless motor that is being fed with currents is low and the currents fed to the motor coils are lower than a limit value, it is possible to control the rotation speed of the motor in accordance with a signal produced on the basis of the back electromotive forces appearing in the motor coils; on the other hand, when the load imposed on a brushless motor that is being fed with currents is high and the currents fed to the motor coils are about to exceed a limit value, it is possible to prevent the currents from becoming higher than the limit. Moreover, since control of the rotation speed is achieved not by directly feeding the currents fed to the motor coils back to the input of a frequency varying means, it is no longer necessary to use, and thus it is possible to eliminate, a phase compensation device as is conventionally required to achieve such current feedback.

What is claimed is:

1. A motor driving device comprising:

a driver for rotating a brushless motor by feeding currents to motor coils provided, one for each phase, in the motor; and a speed detector for detecting rotating speed of the motor with a comparator that compares voltages appearing as back electromotive force in each phase of the motor coils with a voltage appearing at the center contact of the motor coils, wherein the rotation speed of the motor is controlled by feeding a voltage signal output from the speed detector back to the driver in a rectangular wave form after modulating the voltage signal by pulse-width modulation.

2. A motor driving device as claimed in claim 1, wherein the speed detector comprises:

a speed detecting circuit for detecting the rotation speed of the motor by exploiting the back electromotive forces appearing in the motor coils;

a speed discriminator for comparing the rotation speed detected by the speed detecting circuit with a predetermined rotation speed; and a voltage signal generating circuit for producing the voltage signal in accordance with a comparison result of the speed discriminator.

3. A motoring device comprising:

a driver for rotating a brushless motor by feeding currents to motor coils provided, one for each phase, in the motor; and a speed detector for detecting rotation speed of the motor by exploiting back electromotive forces appearing in the motor coils;

wherein the rotation speed of the motor is controlled by feeding a voltage signal output from the speed detector back to the driver after modulating the voltage signal by pulse-width modulation;

wherein the speed detector includes:

an exclusive OR circuit that receives, assuming that the motor includes n-phase motor coils, n voltage signals obtained by delaying phases of voltage signals representing the back electromotive forces appearing in the n-phase motor coils individually by $(180/2n)°$ and that outputs a voltage signal whose period represents the rotation speed of the motor;

a speed discriminator for comparing the period of the voltage signal output from the exclusive OR circuit with a predetermined reference point so as to produce a pulse signal for increasing or decreasing the rotation speed of the motor; and a filter circuit for converting the pulse signal output from the speed discriminator into the voltage signal.

4. A motor driving device as claimed in claim 3, wherein, when the rotation speed of the motor is low, the exclusive OR circuit outputs a voltage signal whose period is longer than the reference period, and then the speed discriminator outputs an accelerating pulse having a first voltage level and having a pulse width equal to the reference period subtracted from the period of the voltage signal output from the exclusive OR circuit, so that the voltage signal output from the filter circuit is decreased, and wherein, when the rotation speed of the motor is high, the exclusive OR circuit outputs a voltage signal whose period is shorter than the reference period, and then the speed discriminator outputs a decelerating pulse having a second voltage level higher than the first voltage level and having a pulse width equal to the period of the voltage signal output from the exclusive OR circuit subtracted from the reference period, so that the voltage signal output from the filter circuit is increased.

5. A motor driving device comprising:

a driver for rotating a brushless motor by feeding currents to motor coils provided, one for each phase, in the motor;

a speed detector for detecting rotation speed of the motor by exploiting back electromotive forces appearing in the motor coils so as to produce a first voltage signal in accordance with the rotation speed of the motor;

a current detector for detecting the currents fed to the motor coils so as to produce a second voltage signal for limiting the currents when the currents are higher than a predetermined value; and a voltage signal selector for selecting one of the first voltage signal output from the speed detector and the second voltage signal output from the current detector on a basis of which one of the first and second voltage signals is higher than the other, wherein, when the currents fed to the motor coils are smaller than the predetermined value within which the currents should be limited, the first voltage signal selected by the voltage signal selector is modulated by pulse-width modulation and is fed back to the driver so that the rotation speed of the motor is controlled, and wherein, when the currents fed to the motor coils are higher than the predetermined value within which the currents should be limited, the second voltage signal selected by the voltage signal selector is modulated by pulse-width modulation and is fed back to the driver so that the currents fed to the motor coils are limited.

6. A motor driving device as claimed in claim 5, wherein the speed detector comprises:

a speed detecting circuit for detecting the rotation speed of the motor by exploiting the back electromotive forces appearing in the motor coils;

a speed discriminator for comparing the rotation speed detected by the speed detecting circuit with a predetermined rotation speed; and a voltage signal generating circuit for producing the first voltage signal in accordance with a comparison result of the speed discriminator.

7. A motor driving device as claimed in claim 5, wherein the speed detector comprises:

an exclusive OR circuit that receives, assuming that the motor includes n-phase motor coils, n voltage signals obtained by delaying phases of voltage signals representing the back electromotive forces appearing in the n-phase motor coils individually by (180/2n)° and that outputs a voltage signal whose period represents the rotation speed of the motor;

a speed discriminator for comparing the period of the voltage signal output from the exclusive OR circuit with a predetermined reference period so as to produce a pulse signal for increasing or decreasing the rotation speed of the motor; and a filter circuit for converting the pulse signal output from the speed discriminator into the first voltage signal.

8. A motor driving device as claimed in claim 7, wherein, when the rotation speed of the motor is low, the exclusive OR circuit outputs a voltage signal whose period is longer than the reference period, and then the speed discriminator outputs an accelerating pulse having a first voltage level and having a pulse width equal to the reference period subtracted from the period of the voltage signal output from the exclusive OR circuit, so that the first voltage signal output from the filter circuit is decreased, and wherein, when the rotation speed of the motor is high, the exclusive OR circuit outputs a voltage signal whose period is shorter than the reference period, and then the speed discriminator outputs a decelerating pulse having a second voltage level higher than the first voltage level and having a pulse width equal to the period of the voltage signal output from the exclusive OR circuit subtracted from the reference period, so that the first voltage signal output from the filter circuit is increased.

9. A motor driving device as claimed in claim 5, wherein the current detector comprises:

a resistor for converting the currents flowing through the motor coils into a voltage;

a comparator for comparing the voltage appearing across the resistor with a predetermined voltage so as to output the second voltage signal when the voltage appearing across the resistor is higher than the predetermined voltage.

10. A motor driving device as claimed in claim 9, wherein the speed detector comprises:

a speed detecting circuit for detecting the rotation speed of the motor by exploiting the back electromotive forces appearing in the motor coils;

a speed discriminator for comparing the rotation speed detected by the speed detecting circuit with a predetermined rotation speed; and a voltage signal generating circuit for producing the first voltage signal in accordance with a comparison result of the speed discriminator.

11. A motor driving device as claimed in claim 9, wherein the speed detector comprises:

an exclusive OR circuit that receives, assuming that the motor includes n-phase motor coils, n voltage signals obtained by delaying phases of voltage signals representing the back electromotive forces appearing in the n-phase motor coils individually by (180/2n)° and that outputs a voltage signal whose period represents the rotation speed of the motor;

a speed discriminator for comparing the period of the voltage signal output from the exclusive OR circuit with a predetermined reference period so as to produce a pulse signal for increasing or decreasing the rotation speed of the motor; and a filter circuit for converting the pulse signal output from the speed discriminator into the first voltage signal.

12. A motor driving device as claimed in claim 11, wherein, when the rotation speed of the motor is low, the exclusive OR circuit outputs a voltage signal whose period is longer than the reference period, and then the speed discriminator outputs an accelerating pulse having a first voltage level and having a pulse width equal to the reference period subtracted from the period of the voltage signal output from the exclusive OR circuit, so that the first voltage signal output from the filter circuit is decreased, and wherein, when the rotation speed of the motor is high, the exclusive OR circuit outputs a voltage signal whose period is shorter than the reference period, and then the speed discriminator outputs a decelerating pulse having a second voltage level higher than the first voltage level and having a pulse width equal to the period of the voltage signal output from the exclusive OR circuit subtracted from the reference period, so that the first voltage signal output from the filter circuit is increased.

* * * * *